(12) United States Patent
Johnson et al.

(10) Patent No.: US 8,617,024 B2
(45) Date of Patent: Dec. 31, 2013

(54) AXLE FINAL DRIVE ASSEMBLY

(75) Inventors: Douglas Rene Johnson, Pune (IN); Jeremy J. Wagner, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 853 days.

(21) Appl. No.: 12/533,577

(22) Filed: Jul. 31, 2009

(65) Prior Publication Data

US 2011/0028265 A1    Feb. 3, 2011

(51) Int. Cl.
 *F16H 3/44* (2006.01)
(52) U.S. Cl.
 USPC ............................. 475/331; 475/221
(58) Field of Classification Search
 USPC ............... 475/205, 221, 225, 311; 74/606 R
 See application file for complete search history.

(56) References Cited

U.S. PATENT DOCUMENTS

| | | | |
|---|---|---|---|
| 3,165,160 A | 1/1965 | Lee et al. | |
| 4,029,166 A | 6/1977 | Haak et al. | |
| 5,557,986 A * | 9/1996 | Young et al. | 74/650 |
| 6,729,995 B1 * | 5/2004 | Bayer | 475/348 |
| 7,204,778 B1 * | 4/2007 | Mimura | 475/225 |
| 7,338,404 B2 * | 3/2008 | Gassmann et al. | 475/231 |
| 7,556,581 B2 * | 7/2009 | Moon | 475/160 |
| 7,951,035 B2 * | 5/2011 | Platt | 475/205 |
| 2006/0172845 A1 * | 8/2006 | Gassmann et al. | 475/205 |
| 2007/0219043 A1 * | 9/2007 | Moon | 475/311 |
| 2007/0287568 A1 * | 12/2007 | Finn | 475/225 |

OTHER PUBLICATIONS

German Search Report for related Application No. DE102010031567.2, Jun. 15, 2011.
John Deere, Current Production Design, Undated, Admitted prior art.
John Deere, 8030T (88") Rear Axle Assembly, Jul. 24, 2006.

* cited by examiner

*Primary Examiner* — Erin D Bishop
*Assistant Examiner* — Huan Le
(74) *Attorney, Agent, or Firm* — Quarles & Brady LLP

(57) ABSTRACT

The invention relates to a final drive assembly. An axle final drive assembly includes an axle housing, and axially inner and outer axle bearings supported by the axle housing. An axle shaft has a flange and is supported for rotation by the outer axle bearing. A planetary transmission has a planet carrier fixed for rotation with the flange of the axle shaft. The planet carrier has a neck which is supported for rotation by the inner axle bearing. The planetary transmission also has a ring gear and a plurality of planet gears which are positioned axially between the inner and outer axle bearings.

7 Claims, 3 Drawing Sheets

AXLE FINAL DRIVE ASSEMBLY

FIELD OF THE INVENTION

The present invention relates to an axle assembly for a vehicle, and more particularly, to a final drive assembly in an axle.

BACKGROUND OF THE INVENTION

Production tracked vehicles have an axle assembly which includes left and right final drive assemblies which transmit power from a differential to left and right axle shafts upon which are mounted left and right drive wheels. The final drive assembly includes a planetary transmission which heretofore has been placed entirely outboard of the axle bearings and inside of the tracks drive wheels. The size of the final drive assembly limits how much the vehicle tread setting can be varied. Therefore, it is desired to reduce the overall physical size of the final drive assembly without sacrificing desired functionality.

SUMMARY OF THE INVENTION

Accordingly, an object of this invention is to provide a more compact axle final drive assembly.

This and other objects are achieved by the present invention, wherein an axle final drive assembly includes a housing which supports axially inner and outer axle bearings. A planetary transmission transmits torque from an output of a differential to an axle shaft, and is positioned axially between the inner and outer axle bearings. This frees up more room on the axle shaft for the mounting of a wheel drive unit.

DESCRIPTION OF THE PREFERRED EMBODIMENT

Figure 1:
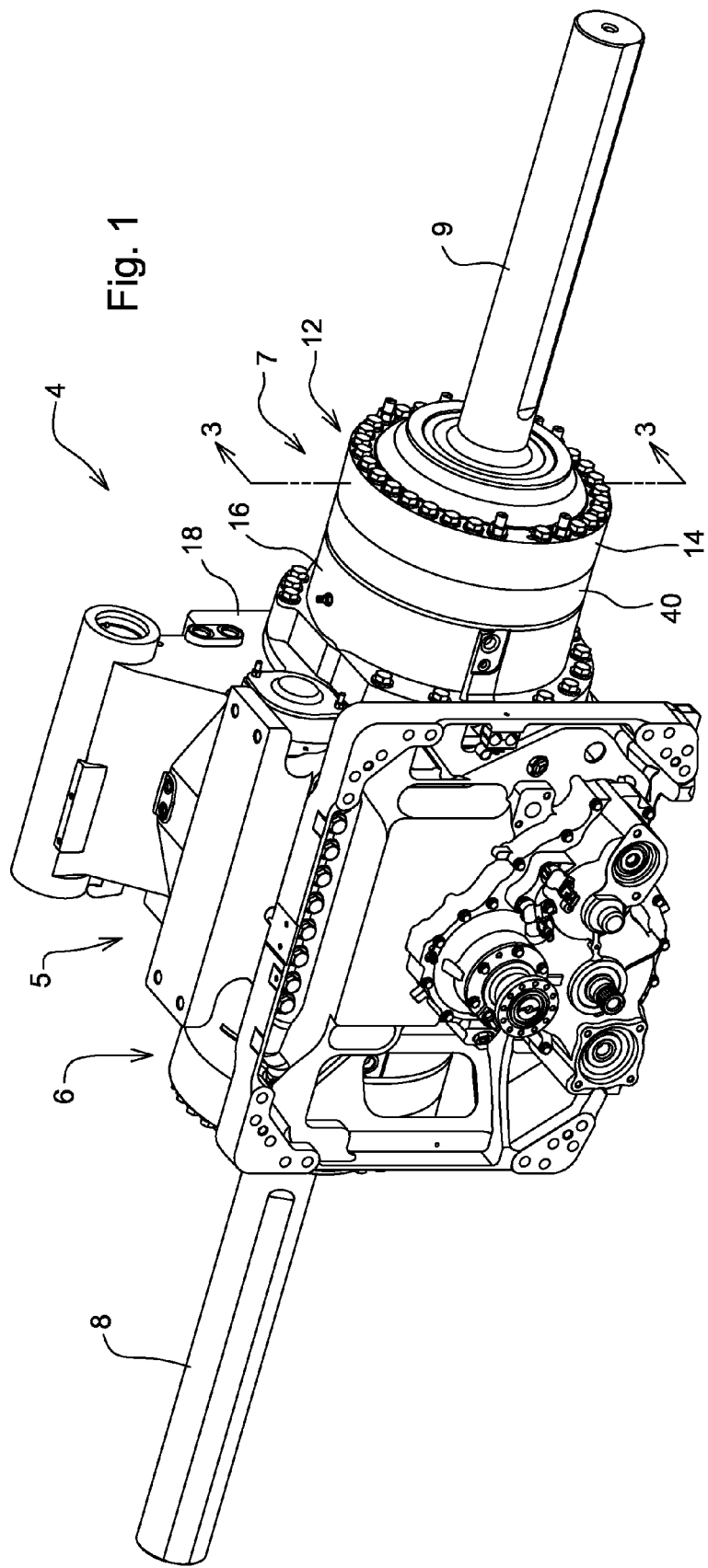
FIG. 1 is a perspective view of an axle assembly embodying the invention.

Referring to FIG. 1, an axle assembly 4 includes a differential 5 and a pair of final drive units 6 and 7 which are attached to the left and right sides of the differential 5, respectively. Axle shafts 8 and 9 project from the final drive units 6 and 7, respectively. Axle shafts 8 and 9 each support a respective left and right drive wheel (not shown), such as a drive wheel of a tracked or a wheeled vehicle (not shown).

Figure 2:
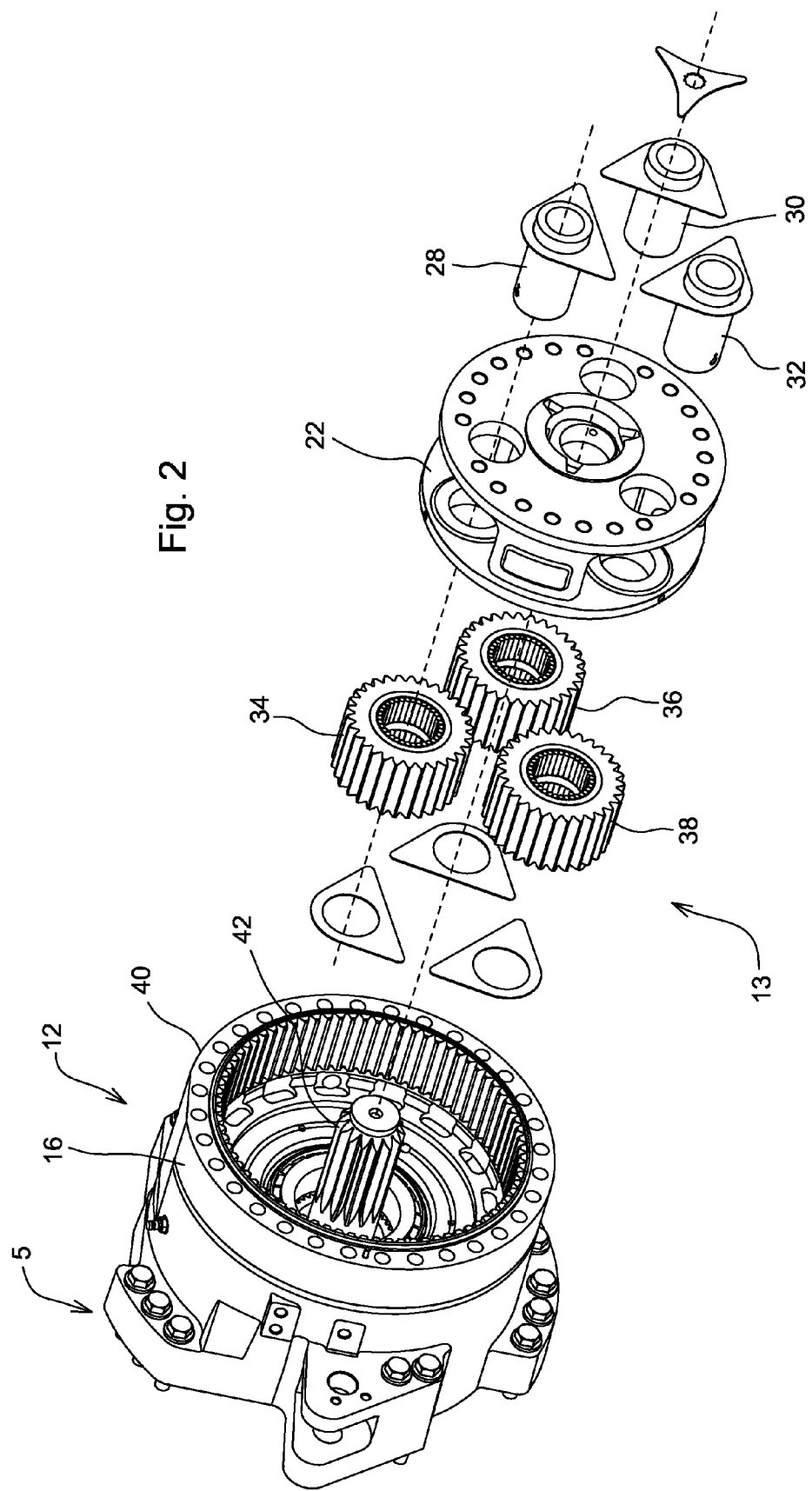
FIG. 2 is an exploded perspective view of one side of the assembly of FIG. 1.
Figure 3:
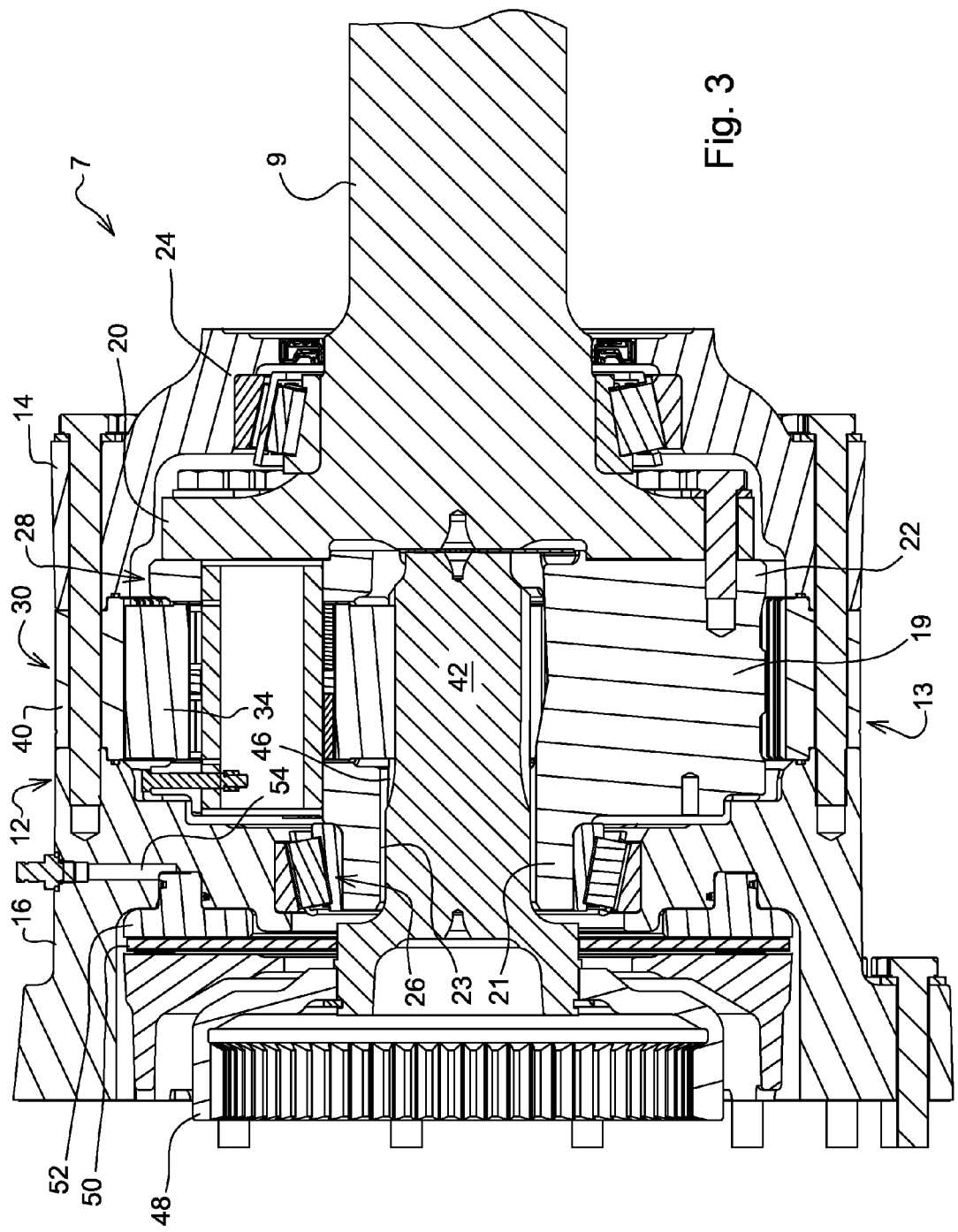
FIG. 3 is a sectional view taken along lines 3-3 of FIG. 1.

Both final drive units 6 and 7 are similar, so the following description of final drive 7 will suffice as a description of both final drive units 6 and 7. Referring to FIGS. 1, 2 and 3, the final drive unit 7 includes a housing 12 which encloses a planetary transmission 13. Housing 12 includes an outer housing 14 (not shown in FIG. 2) and an inner housing 16 which is preferably attached, such as by bolts, to a housing 18 of the differential 5. Axle shaft 9 includes a flange 20 which is fixed, such as by bolts, to a final drive or planet carrier 22. Shaft 9, flange 20 and planet carrier 22 are supported for rotation with respect to the outer housing 14 by outer axle shaft bearing 24. The planet carrier 22 includes a larger diameter main body 19 and a smaller diameter neck 21 which projects axially therefrom. A central bore 23 extends through the body 19 and the neck 21. Neck 21 is rotatably supported with respect to inner housing 16 by inner axle bearing 26. As a result, shaft 9, flange 20 and planet carrier 22 are supported for rotation with respect to the housing 12 by outer axle bearing 24 and inner axle bearing 26.

Planet carrier 22 receives three planet shafts 28, 30 and 32, each which rotatably supports a corresponding planet gear 34, 36 and 38. The planet gears 34-38 meshingly engage an outer ring gear 40 which is held between housing portions 14 and 16. The outer surface of the housing 12 is formed by the outer surfaces of outer housing 14, inner housing 16 and ring gear 40.

A sun gear 42 is received by the planet carrier 22. Gear teeth of each planet gear 34-38 are in meshing engagement with external gear teeth 46 formed on the outer surface of the sun gear 42. Sun gear 42 is driven by an output member 48 of the differential 5. An annular brake disk 50 is mounted for rotation on an inner portion of sun gear 42. A hydraulically operated annular brake piston 52 is engageable with the brake disk 50. The housing 16 forms a brake chamber 54 for applying hydraulic pressure to the brake piston 52.

As a result, except for the neck 21, the planetary transmission 13 of the final drive unit 7 is located entirely in between the outer and inner axle shaft bearings 24 and 26. The remainder of shaft 9 outside of housing 14 is thereby free to accommodate a drive wheel (not shown) at any location thereon.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. An axle final drive assembly comprising:
a housing, having an outer housing portion, and an inner housing portion;
an axially inner axle bearing supported by the housing;
an axially outer axle bearing supported by the housing;
an axle shaft supported for rotation by the outer axle bearing; and
a planetary transmission having a planet carrier fixed for rotation with the axle shaft, the planet carrier being supported for rotation by the inner axle bearing, and the planetary transmission having a ring gear and a plurality of planet gears which are positioned axially between the inner and outer axle bearings, wherein the ring gear is disposed between the outer housing portion and the inner housing portion;
wherein the axle shaft includes a flange and the planet carrier is fixed to the flange and the carrier mounts the inner axle bearing.

2. The final drive assembly of claim 1, further comprising:
a sun gear coupled to and received by the planet carrier.

3. The final drive assembly of claim 2, further comprising:
a brake disk mounted for rotation on the sun gear;
a brake piston movably mounted in the housing; and a brake chamber formed in the housing for applying hydraulic pressure to the brake piston.

4. The final drive assembly of claim 3, wherein:
the inner axle bearing is positioned between the brake disk and the planet carrier.

5. An axle final drive assembly comprising:
an axle housing, having an outer housing portion, and an inner housing portion;
an axially inner axle bearing supported by the axle housing;

an axially outer axle bearing supported by the axle housing;

an axle shaft having a flange, the axle shaft being supported for rotation by the outer axle bearing; and a planetary transmission having a planet carrier bolted to the flange of the axle shaft for rotation about an axis of rotation, the planet carrier having a neck of reduced diameter with respect to the axis of rotation which mounts the inner axle bearing, and the planetary transmission having a ring gear and a plurality of planet gears which are positioned axially between the inner and outer axle bearings, wherein the ring gear is disposed between the outer housing portion and the inner housing portion.

6. The final drive assembly of claim 5, further comprising:

a sun gear coupled to and received by the planet carrier; and a brake disk mounted for rotation on the sun gear; a brake piston movably mounted in the housing; and a brake chamber formed in the housing for applying hydraulic pressure to the brake piston.

7. The final drive assembly of claim 6, wherein:

the inner axle bearing is positioned between the brake disk and the planet carrier.

* * * * *